Oct. 1, 1946.   F. J. LAPOINTE   2,408,521
BROACHING MACHINE
Filed Feb. 10, 1942   7 Sheets-Sheet 1

Fig. 1.

INVENTOR.
Francis J. Lapointe.
BY
Atty.

Oct. 1, 1946.  F. J. LAPOINTE  2,408,521
BROACHING MACHINE
Filed Feb. 10, 1942   7 Sheets-Sheet 2

INVENTOR.
Francis J. Lapointe,
BY
Atty.

Oct. 1, 1946.  F. J. LAPOINTE  2,408,521
BROACHING MACHINE
Filed Feb. 10, 1942  7 Sheets-Sheet 5

Oct. 1, 1946.   F. J. LAPOINTE   2,408,521
BROACHING MACHINE
Filed Feb. 10, 1942   7 Sheets—Sheet 6

Fig. 10.

INVENTOR.
Francis J. Lapointe,
BY
Atty.

Oct. 1, 1946.  F. J. LAPOINTE  2,408,521
BROACHING MACHINE
Filed Feb. 10, 1942    7 Sheets-Sheet 7

Patented Oct. 1, 1946

2,408,521

UNITED STATES PATENT OFFICE 2,408,521

BROACHING MACHINE

Francis J. Lapointe, Ann Arbor, Mich., assignor to American Broach & Machine Co., Ann Arbor, Mich., a corporation of Michigan Application February 10, 1942, Serial No. 430,235

16 Claims. (Cl. 90—33)

This invention relates to a broaching machine and to a method of broaching by the use of such machine, and it is illustrated herein as embodied in a mechanism designed particularly for producing the rifling in a gun or cannon barrel.

One object of the invention is to provide a broaching machine in which a series of broaches is employed in a manner to secure an unusually smooth and accurate result.

Another object of the invention is to provide a machine in which a series of broaches is employed to complete a piece of work and in which a rack or support is arranged to travel with the moving element of the machine so as to be conveniently positioned at all times for presenting the broaches when they are wanted for use in the machine, and for receiving the broaches as they are removed therefrom.

A further object of the invention is to provide a special arrangement for supplying coolant to a broach and to the work during the broaching operation.

It is also an object of the invention to provide a broaching machine for drawing a broach through the bore of a piece of work to form splines or grooves therein, together with mechanism for rotating one of the parts to render the resulting grooves or splines helical in form; and it is a further object to arrange the mechanism for this purpose in a compact assembly without undue elongation of the machine.

More specifically, it is an object of the invention to provide a machine having a support for a work piece in which a bore is to be broached, together with a tube sealably connectible with the bore of the work piece and dimensioned to enclose the broach in its initial position, together with means for supplying coolant to the tube and to the broach as the latter is forced through the bore of the work piece.

Other objects and advantages of the invention will appear from the following description, taken in connection with the accompanying drawings, in which.

While the invention is susceptible of various modifications and alternative constructions, it is shown in the drawings and will be described hereinafter in a preferred embodiment, but it is not intended that the invention is to be limited thereby to the specific embodiment disclosed, but it is intended to cover all modifications and alternative constructions falling within the spirit and scope of the appended claims.

Figure 1:
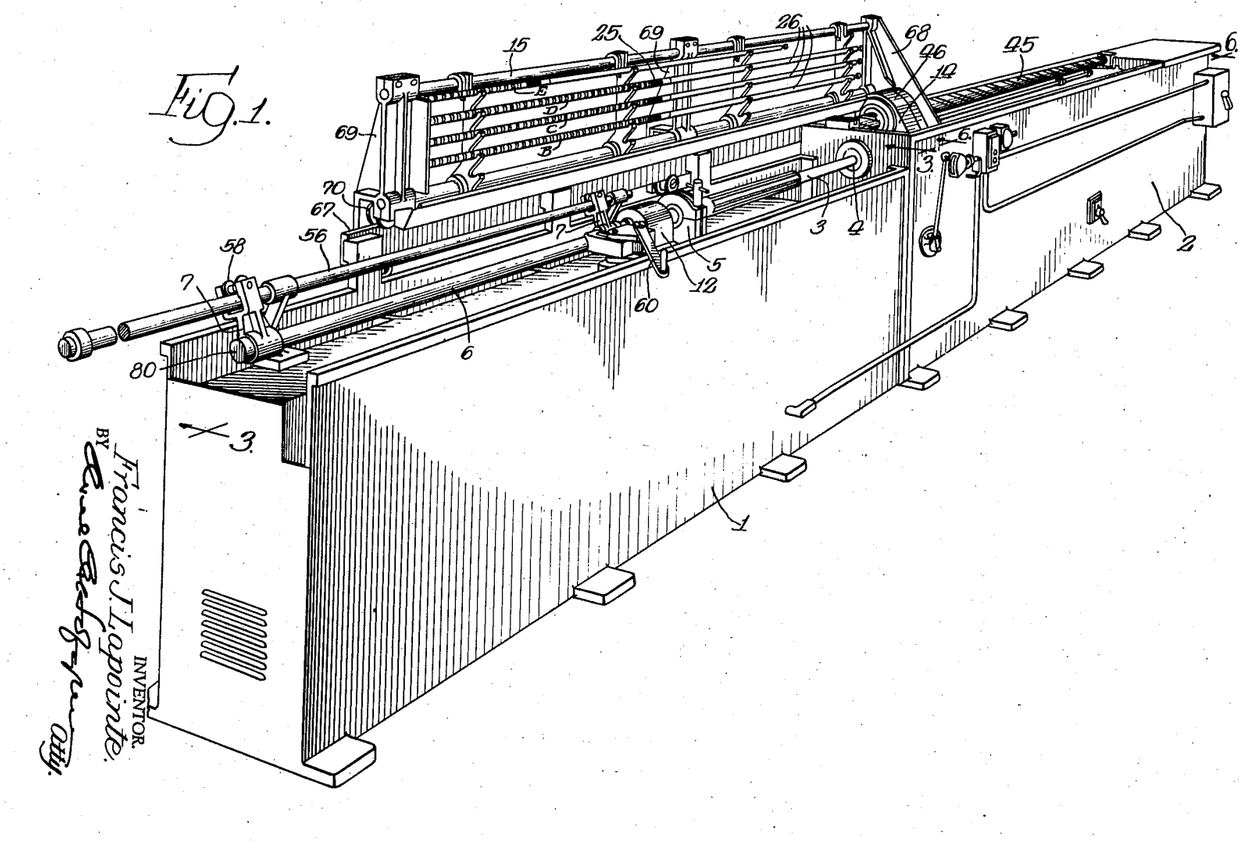
Fig. 1 is a perspective view of a broaching machine embodying this invention showing a gun barrel mounted in position to be operated upon and showing the broach-carrying rack disposed substantially in its initial position in relation to the working stroke.
Figure 2:
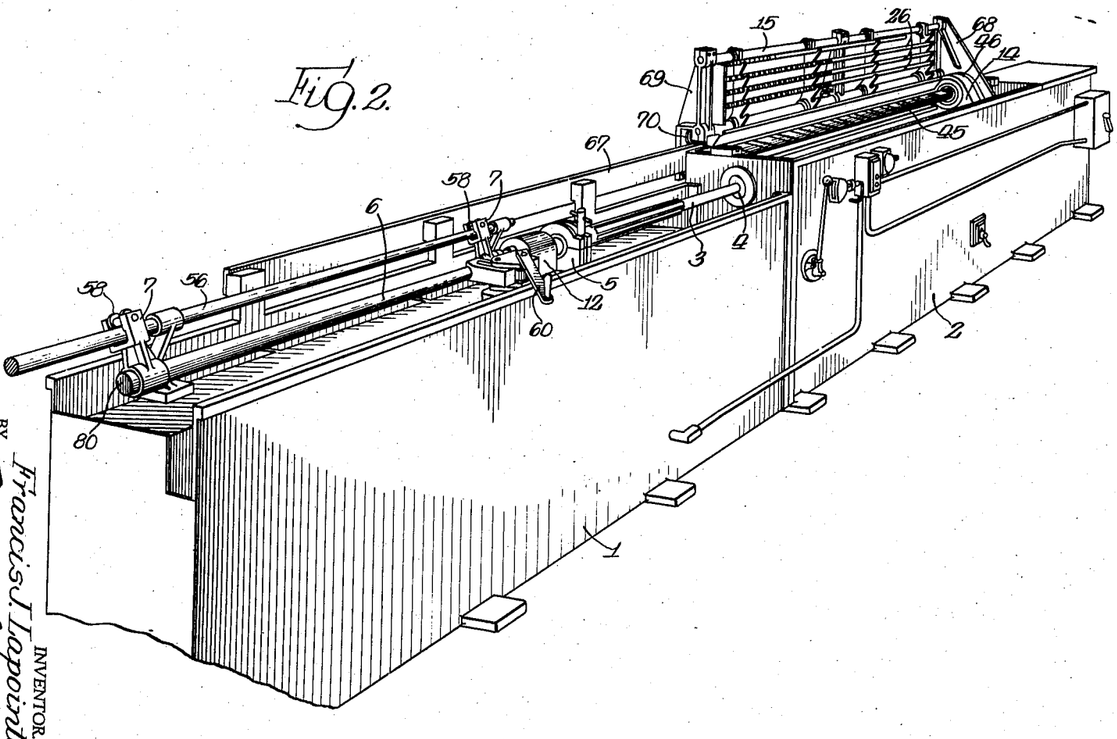
Fig. 2 is a similar perspective view of the machine showing the pull head and broach rack at the positions which they assume at the end of the working stroke.
Figures 3, 4, 5:
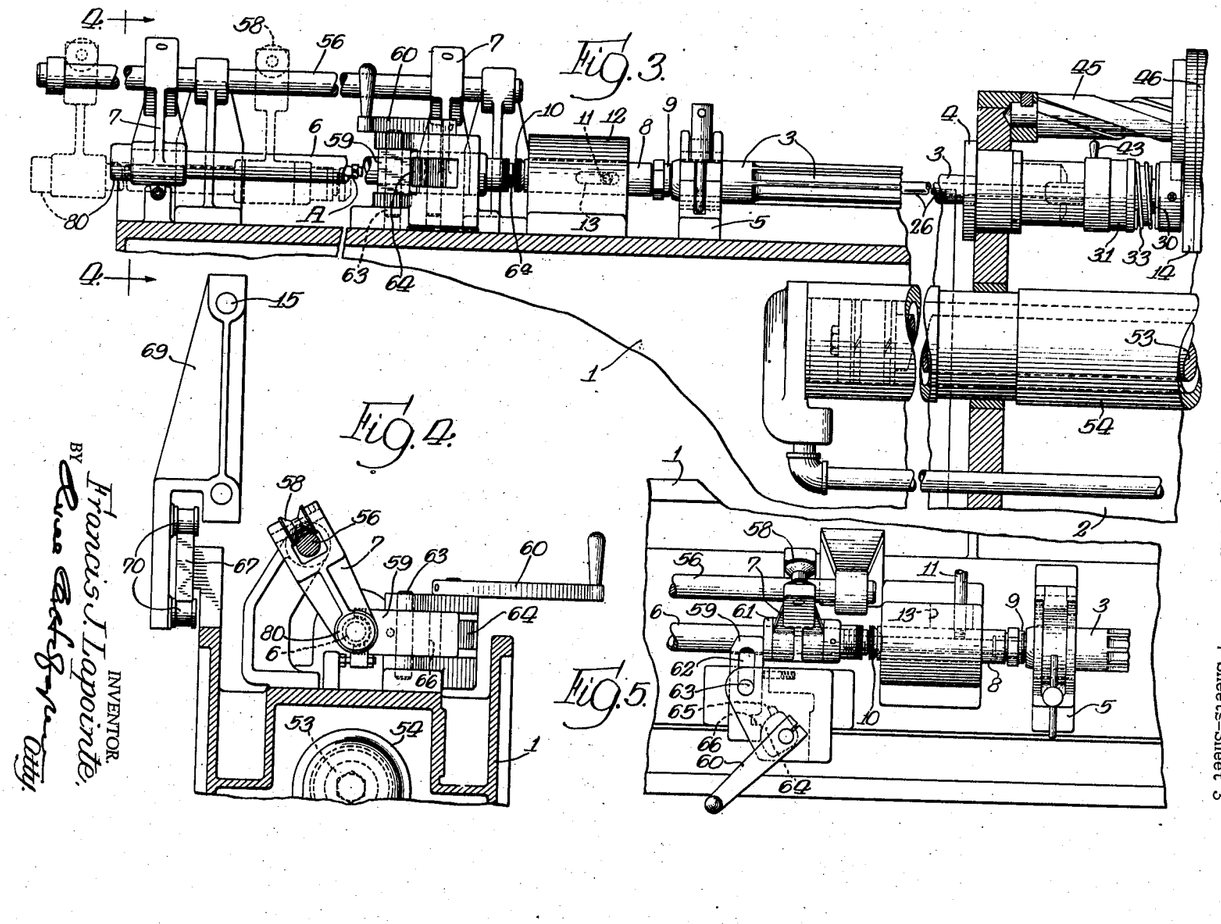
Fig. 3 is a vertical sectional view of the principal working parts of the machine with portions broken out to condense the view longitudinally, and showing a portion of a gun barrel in position to be broached.
Fig. 4 is a transverse vertical section taken as indicated at line 4—4 on Fig. 3.
Fig. 5 is a detail plan view of the work holding fixture and coolant tube connection shown in Fig. 3.

Certain principles of the present invention will be applicable to broaching operations in which straight grooves or splines are formed in the bore of a work piece, but in the machine herein shown in the drawings the mechanism is arranged, and the broaches themselves are designed, for giving a predetermined pitch to the splines to produce the helical form commonly known as "rifling," as applied to a gun barrel. As shown in Figs. 1 and 2, the machine comprises two principal sections connected together end to end; these are the work table section 1 and the mechanism section 2. A gun barrel 3 is shown supported on the work table 1 by the insertion of one end of the barrel in a centering chuck or collar 4 and with the opposite end secured in a separable clamp device at 5. A coolant tube 6 is carried by brackets 7, 7 in a position in which it is axially alined with the gun barrel 3 and the end of the tube is connected with a longitudinally adjustable section 8 which terminates in a sealing fixture 9 directly engageable with the end of the gun barrel 3. A disengageable coupling 10 permits liquid-tight connection between the section 8 and the tube 6, and a flexible pipe connection is provided at 11 for supplying coolant liquid to the interior of the part 8 from which it flows into the tube 6 and into the gun barrel 3 during the broaching operation. The fixed support 12, in which the part 8 is slidably mounted, is slotted at 13 to accommodate the supply tube 11 and permit limited longitudinal movement of the part 8 in the support.

Figures 13, 14, 15, 16, 17:
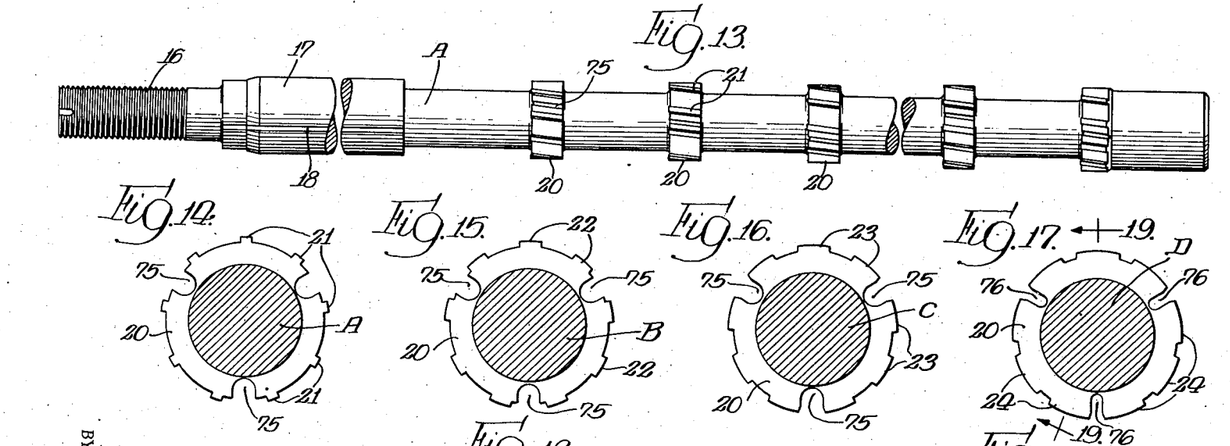
Fig. 13 is a side elevation of the first broach of the series employed in the gun rifling operation, with parts broken out to condense the view longitudinally.
Fig. 14 is a cross section of the first broach of the series.
Fig. 15 is a cross section of the second broach of the series.
Fig. 16 is a cross section of the third broach of the series.
Fig. 17 is a cross section of the fourth broach of the series.

It will be understood that the number of broaches employed in a series to produce a given piece of work will vary with the nature of the work and the character of the broaches themselves; in the illustrated machine there is employed a series of four broaches, with an optional fifth broach which may be used for a final finishing operation. Each of the regular four broaches includes a series of graduated cutting teeth, and is provided with a pull rod or shank which is disengageably connected to the leading end of the broach and which is long enough to extend through the gun barrel for attachment to the pull head of the machine by which the broach is drawn through the barrel for its cutting operation. It may be assumed that, as shown in Fig. 1, the machine is ready for the first broaching operation, with the first broach mounted in working position and enclosed within the coolant tube 6, while the pull rod or shank for the broach extends through the gun barrel 3 and is coupled to the pull plate seen at 14. The remaining three broaches of the regular series and the finishing broach are shown on the rack 15 ready for use as needed. Fig. 13 shows the first broach A as comprising a threaded terminal 16 with an adjacent cylindrical pilot section 17, which may have grooves 18 for lubricant or coolant; at intervals along the shank of the broach A are the cylindrical cutting teeth 20 of graduated diameter and with their cutting splines 21 of uniform width throughout the length of the broach. In accordance with the present invention, the second broach shown in section at B in Fig. 15 has a series of splines 22 which are wider than the splines 21 of the first broach, but the successive teeth of the broach B correspond in external diameter to those of the broach A. Similarly in the broach C (see Fig. 16), the splines 23 are wider than the splines 22, but the teeth are graduated through the same range of diameters as in the preceding broaches; and, likewise, in the broach D the splines 24 are still wider than those of the preceding broaches, but the diameters of the teeth range through the same graduated series. In other words, the first broach cuts grooves in the bore of the gun barrel 3 to the full required depth, and each successive broach widens these grooves until the final width is attained, and the splines left standing in the gun barrel constitute the desired rifling effect. And since this rifling is to have a helical pitch, all the broach teeth are cut with this pitch and each broach is rotated at a predetermined rate as it is drawn through the work. The first broach A is positively rotated by mechanism, hereinafter described, and each of the succeeding broaches is provided with a helically fluted pilot section such as that shown at 25 on the broach B in Fig. 18. The splines of each pilot section are dimensioned to fit the helical grooves formed by the preceding broach, and the broaches B, C and D are free to turn in response to this interengagement of their pilot sections with the broached grooves in the gun barrel.

Figures 18, 19, 20:
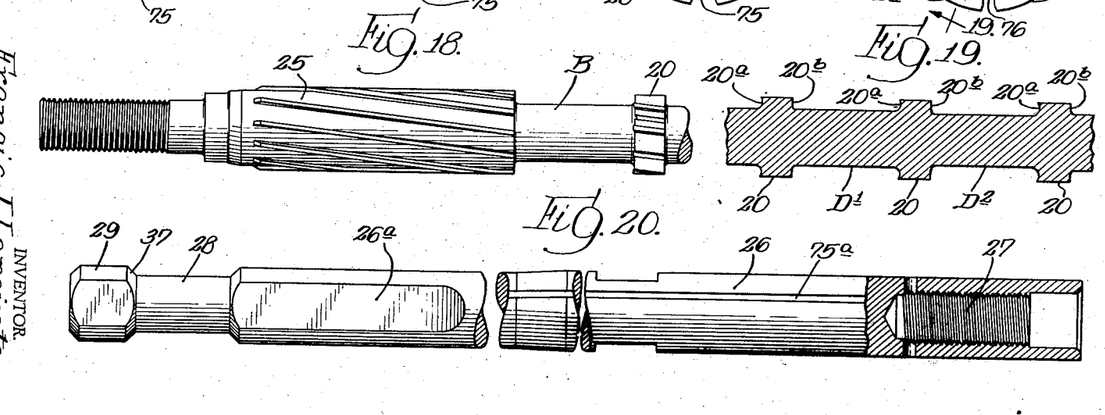
Fig. 18 is a side elevation of the leading end portion of a typical broach.
Fig. 19 is an axial section of a portion of a certain broach of the series, taken as indicated at line 19—19 on Fig. 17.
Fig. 20 is a side elevation of a pull rod employed in connection with the broaches, with parts broken out to condense the view.

Fig. 20 shows the pull rod or shank 26 provided for the broach A. This rod includes a hollow, threaded terminal 27 for engagement with the threads of the terminal 16 on the broach A, and at its opposite end the rod is reduced at 28, leaving a head portion 29 which is engageable in the pull head of the machine as shown in detail in Fig. 10.

Figure 10:
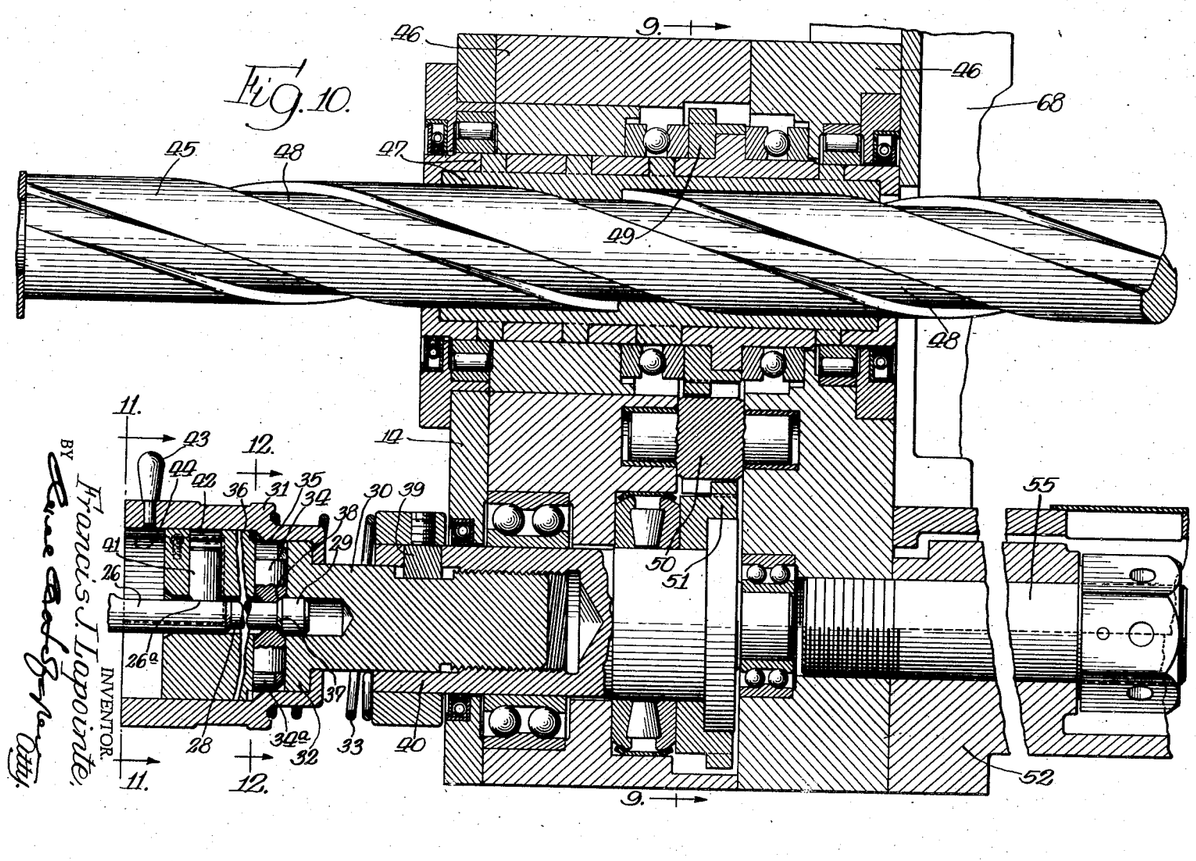
Fig. 10 is a detail section taken as indicated at line 10—10 on Fig. 9.
Figure 11:
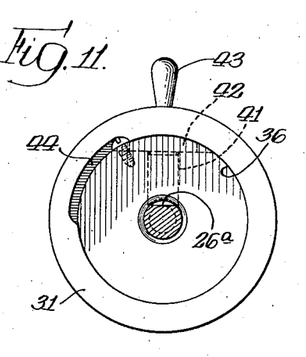
Fig. 11 is a detail section at line 11—11 on Fig. 10.
Figure 12:
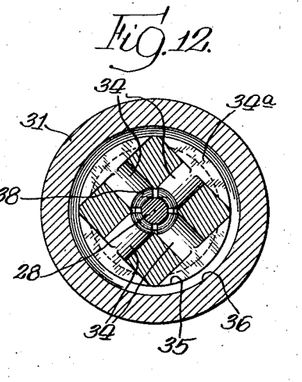
Fig. 12 is a detail section at line 12—12 on Fig. 10.

This pull head includes a stem 30 with a cylindrical shell 31 slidably mounted thereon and held yieldingly against the head 32 of the stem 30 by coiled spring 33. In this position the four radially slidable jaw members 34 in the head are held at their inner limits of movement by engagement of their T-heads 34ª with the wall 35 of the shell 31 at its smaller internal diameter, so that the inner ends of the jaws engage the reduced portion 28 of the pull rod with the head 29 stopped against the jaws as seen in Fig. 10. To release the pull rod, it is only necessary to push back the shell 31 against the pressure of spring 33 so as to bring the larger internal diameter of the shell at 36 into registration with the jaws 34, leaving them free to move outwardly. The beveled shoulder 37 of the pull rod acting against the beveled edges 38 of the jaws 34 operates to shift them outwardly for releasing the rod 26.

The threaded end of the stem 30 of the pull head is secured in a rotatably mounted shaft 40 and is interlocked therewith by means of a key 39 so as to turn with the shaft. In order to cause the pull rod 26 for the first broach A to be turned by the rotation of the shaft 40 and the pull head interlocked therewith, the head portion 32 carries a radially disposed plunger 41 having a T-head 42 which, when engaged with the inner surface 36 of the shell, holds the plunger 41 inwardly to engage the flat area 26ª of the shank 26. The pull rods for the other broaches B, C and D are not formed with these flat areas and are not intended to be interlocked for rotation with the pull head 32; therefore, when the other broaches are employed the shell 31 is rotated through a limited angle by its handle 43 to bring a clearance notch 44 into registration with the T-head 42 and allow the plunger 41 to move outwardly so as to accommodate the full diameter of the pull rod without interlocking engagement therewith. This leaves the pull rod and its broach free to turn in the pull head so as to follow exactly the rifling produced by the first broach A, although the relative rotation between the broach B, C or D and the pull head will be very slight, in view of the fact that the pull head will be rotated in each of the succeeding broaching operations, just as it is during the operation of the broach A.

Figures 6, 7, 8:
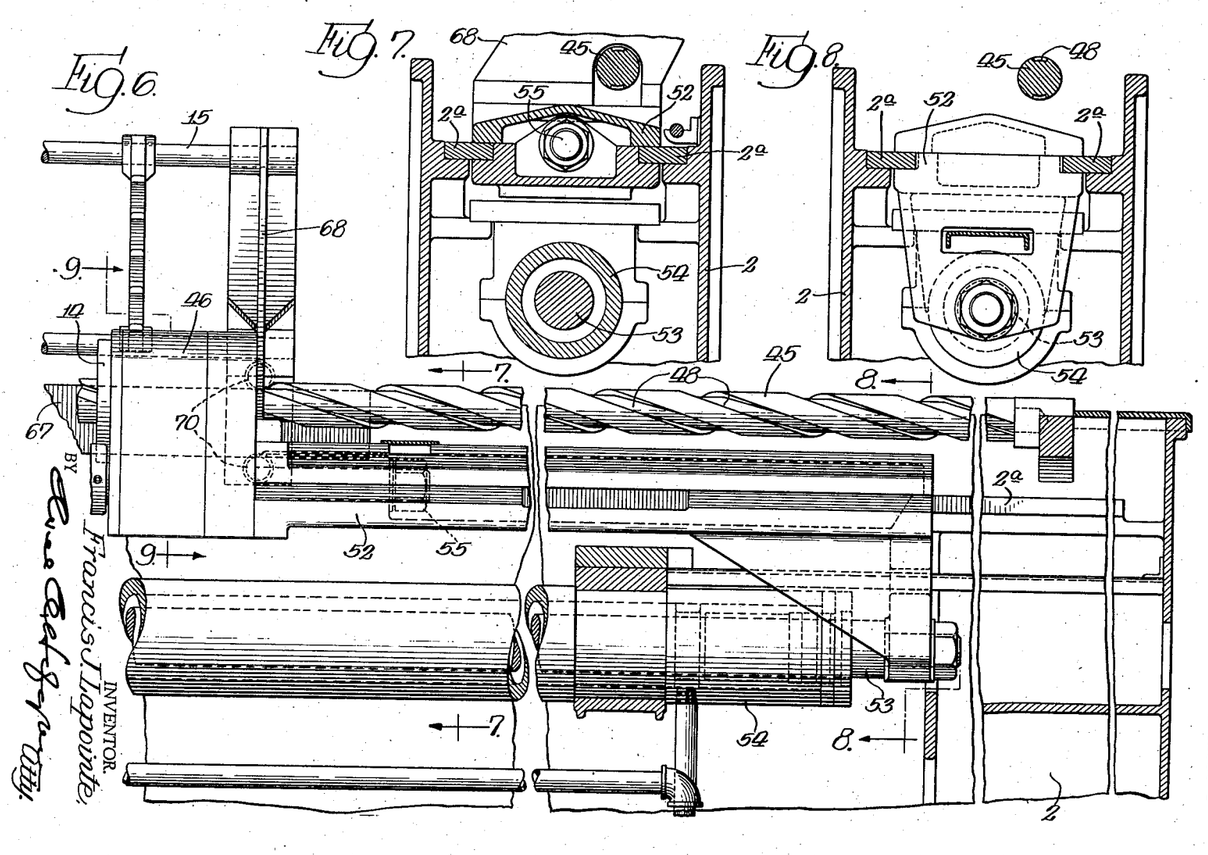
Fig. 6 is a front elevation, partly in section, constituting largely a longitudinal extension of Fig. 3 to show the lead screw and the hydraulic cylinder for operating the broach.
Fig. 7 is a transverse vertical section taken as indicated at line 7—7 on Fig. 6.
Fig. 8 is a transverse section taken as indicated at 8—8 on Fig. 6.
Figure 9:
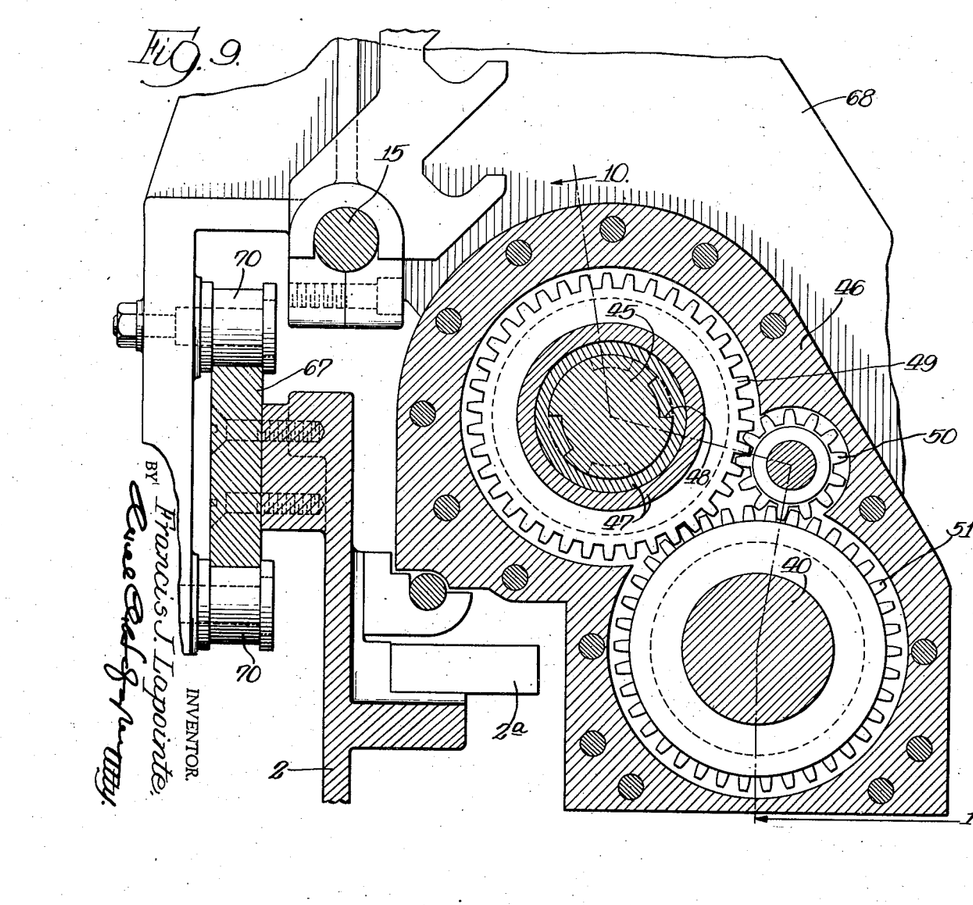
Fig. 9 is a transverse section on a larger scale taken as indicated at line 9—9 on Fig. 6.

For effecting the rotation of the pull head, there is mounted in the mechanism section 2 a lead screw 45, sometimes referred to as a "spiral bar," which is fixed against rotation and against endwise movement. The pull plate 14 is secured to the face of a traveling crosshead or bearing block 46 in which there is journaled a nut 47 threaded to fit the helical grooves 48 of the lead screw 45 so as to be rotated about its axis when the crosshead 46 travels along the axis of the screw 45. The nut 47 carries a gear 49 which meshes with an idler pinion 50 by which rotation is transmitted to a gear 51 secured to the shaft 40 in which the pull head is carried. The heavy bearing block or crosshead 46 is mounted to travel along suitable ways 2ᵃ provided in the section 2 of the machine, and is connected by an extension or slide 52 with a hydraulic ram 53, as shown in Fig. 6. The cylinder 54 is conveniently mounted in the lower portion of the housing of the mechanism section 2 and may extend under the work table 1. Movement of the ram 53 to the right, as seen in Fig. 6, carries the extension 52 with it and draws the crosshead 46 and pull plate 14, together with the pull head 31, in the direction to draw the broach through the gun barrel 3. For convenience in construction, the bearing block 46 consists of two principal portions assembled face to face, and the extension 52 is connected to the bearing block by means of a threaded stud, seen at 55 in Fig. 10.

To facilitate the placing of each broach in the machine in the position of use, the coolant tube 6 is carried by its brackets 7 on a rod 56 and the brackets 7 engage said rod by means of rollers 58 carried in the brackets so that the rod 56 constitutes a track or running rail upon which the coolant tube 6 may be moved bodily away from the end of the gun barrel 3; and when the tube 6 has been thus shifted a short distance, it may be swung about the axis of the rod 56 and out of line with the gun barrel so as to leave the open end of the barrel exposed for insertion of the pull rod or shank, such as the rod 26. The adjacent end of the tube 6 is also left exposed for insertion of the broach itself, after which the broach and its pull rod may be joined at their threaded terminals, such as those shown at 16 and 27 in Figs. 13 and 20, respectively, the tube 6 being swung into alignment with the gun barrel for this purpose. Preferably, however, each broach is left connected with its pull rod, as seen on the rack 15 in Fig. 1, and the length of the track 56 is sufficient to permit retraction of the coolant tube 6 past the position occupied by the broach when its pull rod has been inserted into the gun barrel 3 and connected into the pull head at 31. The pull rod and broach will then extend through the connecting sleeve 8 and beyond said sleeve into space to a point adjacent the open end of the tube 6. The tube may then be slipped over the broach, its brackets 7 riding along the track 56 until the open end of the tube 6 approaches the sleeve 8, the latter having been already shifted into sealing position relative to the gun barrel at 9. The beveled connector 10, being adjustable on the threaded terminal 6ᵃ of the tube 6, will have been set to fit snugly into the open end of the sleeve 8 and at this position a slidable locking dog 59 is shifted by its operating handle 60 into holding position in contact with a collar 61 on the tube 6 and adjacent one of the brackets 7. The locking dog 59 is not only slidable into locking position by virtue of its slot 62 engaging the supporting pin 63, but the handle 60 is connected to operate a cam member 64 having a single tooth 65 which first engages in a notch 66 of the dog 59 to shift it toward locking position, after which the slightly eccentric surface of the cam 64 bears against the tail portion of the dog 59 and rocks its opposite end against the collar 61, forcing the connector 10 at the end of the tube into firm sealing engagement with the sleeve 8, also effecting a similar engagement of the terminal 9 with the gun barrel 3. Reverse rotation of the handle 60 will effect a quick release of the coupling 10 from the sleeve 8 when the next broach is to be installed in working position.

Just prior to the working stroke of the broach, the rack 15 stands opposite the work table section 1 in convenient position for the operator when he is ready to place the broach in the machine, as just described. When the broaching stroke has been completed, the bearing block 46 with the pull plate 14 and the pull head will have arrived near the remote end of the mechanism section 2, as shown in Fig. 2, and will have withdrawn the broach and its pull rod from the end of the gun barrel supported at 4. Thus it is only necessary to release the pull rod by shifting back the shell 31 of the pull head, as already described, in order to remove the broach from the machine. As the operator does this he finds the rack 15 conveniently positioned adjacent the point at which he is removing the broach, because the rack itself is mounted for travel on a running rail 67 extending along the back of the sections 1 and 2. The bracket 68 forming one end of the rack 15 is securely attached to the bearing block or head 46. This bracket and the other upright brackets 69, which are elements of the frame 15, are provided with bearing rollers 70 which ride upon the rail 67 as the frame 15 moves back and forth with the pull head. Thus the operator may easily place on the rack the broach which he has just removed from the machine, and he will then shift the machine into reverse, causing the block 46 and its pull head to travel back to the position shown in Fig. 1. At the same time, the rack 15 will move back to a position opposite the work table so that, as the operator releases the coolant tube 6 from the end of the gun barrel and shifts the tube out of the way, he can remove from the rack 15 the next broach to be employed and insert it in position.

As shown in Figs. 14, 15 and 16, each of the broaches A, B and C has three channels 75, extending longitudinally and positioned to register with spaces between the cutting splines of the teeth; in the broach D (see Fig. 17) the corresponding channels 76 are narrower than the channels 75 because the available spaces are narrower. The coolant, which is supplied under pressure through the pipe 11 to the tube 8, flows into the tube 6, which is closed at its outer end by its cap 80 and thus maintains the coolant under pressure as it follows along the channels 75, or 76, of the broach during the progress of the broach through the gun barrel 3. As indicated in Fig. 19, the cutting teeth 20 are slightly undercut at their forward sides 20ᵃ adjacent their cutting edges, but at the rear sides, 20ᵇ, instead of being backed up with inclined portions, they are made with faces substantially perpendicular to the axis. It is found that with beveled or inclined backing there is a tendency for the coolant, flowing from the rear end of the broach under pressure, to force the chips outwardly along the inclined backing, causing them to pack and to scratch the interior surface of the gun barrel. But with the rear faces of the teeth as shown in Fig. 19, perpendicular to the axis, these faces merely act to dam the flow without moving the chips outwardly or wedging them against the bore of the gun.

It may be understood that the number of broaches employed to produce a satisfactory result will vary somewhat, depending upon the length of the working stroke, the depth of the cut, and the character of the metal being worked upon. With the set of four broaches herein shown, the final finishing cut will usually be made with the fourth broach D, but occasionally this broach may become slightly dull, not perceptibly so, but sufficiently to leave slight scratches on the work. In such cases the fifth broach, E, having its final cutting teeth just a trifle larger than those of the broach D, but with splines of exactly the same width, is pulled through the bore, thus very slightly increasing its diameter within the limiting tolerance and cleaning up any imperfections in the surface.

But on the assumption that the broach D will usually make the final cut, it may be explained that the graduated series of teeth for broaches A, B and C vary in diameter through exactly the same range, while the finishing broach D has a few teeth at the larger end which are slightly larger than the final teeth of the other broaches. The pilot sections of the first three broaches have body diameters which are all slightly less than the bore of the gun barrel, allowing two or three thousandths of an inch for working clearance. This may permit the first three broaches to shift slightly so that they may not follow each other perfectly, and may cause reflections or even slight steps in the grooves which are successively widened by these three broaches. These imperfections are corrected by the larger final teeth of broach D, or the final broach of whatever number compose the complete series for a given job. This final broach also differs from the others in that its body diameter between successive teeth is made substantially smaller toward the finishing end than at the leading end. In a broach having about thirty teeth, the body diameter between the last fifteen to eighteen teeth is thus made several thousandths of an inch smaller than the preceding portions of the body and, to the same extent, smaller than the body portions of the preceding broaches; the final chips removed by the last teeth of this broach are so thin that this extra clearance space is provided for them to insure that they shall not become wedged or jammed in such positions as to scratch the bore of the gun barrel, and, as will be evident, this added clarance also permits a freer flow of oil or coolant, which contributes further toward keeping the chips from causing damage to the finished surface. Fig. 19 may be considered as a fragmentary section through the axis of the broach D, showing a body portion of larger diameter at $D^1$ and an adjacent body portion $D^2$ of the smaller diameter.

I claim as my invention:

1. In a broaching machine, a horizontally elongated frame, a pull head mounted for horizontal reciprocation thereon, a broach connected to the pull head, work supporting means for a work piece having a bore to be broached, a tube for coolant, closed at one end, alignable with the bore of the work piece and provided with means at its other end to form a disengageable sealed connection with said bore, said tube being dimensioned to enclose the broach when the latter is positioned at the beginning of its working stroke, and supporting means for said tube on which said tube is movable out of connection with said bore into a position exposing the open end of the tube for entry of the broach therein.

2. In a broaching machine, a horizontally elongated frame, a pull head mounted for horizontal reciprocation thereon, a broach connected to the pull head, work supporting means for a work piece having a bore to be broached, a tube for coolant closed at one end and open at the other end supported in alignment with said bore, said tube having a shoulder and locking means movably mounted on the frame and adjustable to exert pressure on the shoulder and effect sealing engagement of the open end of the tube with said bore, said tube being dimensioned to accommodate the broach in its initial position preparatory to the broaching stroke.

3. In a broaching machine, a horizontally elongated frame, a pull head mounted for horizontal reciprocation thereon, a broach connected to the pull head, work supporting means for a work piece having a bore to be broached, a tube for coolant closed at one end and open at the other end supported in alignment with said bore, said tube having an external shoulder, a locking member on the frame slidable transversely of the tube into and out of engagement with said shoulder, guiding means for said locking member on which it is also swingable toward and from the shoulder, and a cam operable to swing the locking member against the shoulder to effect a sealing connection between the open end of the tube and said bore of the work piece, said tube being dimensioned to accommodate the broach in its initial position preparatory to the broaching stroke.

4. In a broaching machine, a horizontally elongated frame, a pull head mounted for horizontal reciprocation thereon, a broach connected to the pull head, work supporting means for a work piece having a bore to be broached, a tube for coolant, closed at one end, alignable with the bore of the work piece and provided with means at its other end to form a disengageable sealed connection with said bore, said tube being dimensioned to enclose the broach when the latter is positioned at the beginning of its working stroke, and supporting means for said tube comprising a single rail mounted on the frame parallel to the axis of said bore of the work piece and extending therefrom in the same direction as said tube, together with carrying brackets embracing said rail and extending therefrom to the tube adapted to ride along the rail or to swing thereon about the axis thereof to carry the tube longitudinally away from the bore or shift it transversely out of alignment therewith, to facilitate placing the broach in working position.

5. In a broaching machine, a horizontally elongated frame, a pull head mounted for horizontal reciprocation thereon, a broach connected to the pull head, work supporting means for a work piece having a bore to be broached, a tube for coolant, closed at one end, alignable with the bore of the work piece and provided with means at its other end to form a disengageable sealed connection with said bore, said tube being dimensioned to enclose the broach when the latter is positioned at the beginning of its working stroke, and supporting means for said tube on which the tube is movable transversely upon disconnection from said bore of the work piece to expose the open end of the tube for entry of the broach therein, said broach having a detachable shank initially disposable in the bore of the work piece and connectible with the broach upon realignment of the tube with said bore.

6. In a broaching machine, a horizontally elongated frame, a pull head mounted for horizontal reciprocation thereon, a broach connected to the pull head, work supporting means for a work piece having a bore to be broached, a tube for coolant, closed at one end, alignable with the bore of the work piece and provided with means at its other end to form a disengageable sealed connection with said bore, said tube being dimensioned to enclose the broach when the latter is positioned at the beginning of its working stroke, and supporting means for said tube including a track along which the tube is retractable away from the end of the work piece by a distance approximating the length of the broach, said broach having an elongated shank which is initially inserted in the bore of the work piece with the broach proper extending toward the retracted tube, whereby said tube is then movable upon its track into telescoping relation with the broach and sealing connection with the bore.

7. In a broaching machine, a horizontally extending frame, a pull head mounted for reciprocation along the frame, supporting means on the frame for a work piece having a bore to be broached, a rack formed to support a plurality of broaches which are designed to be engaged by the pull head and to operate successively upon the bore of the work piece, said rack being movable along the frame in a path substantially parallel with that of the pull head, said rack being initially disposed adjacent the position at which a broach is inserted in the pull head, and means shifting said rack during the working stroke of the broach to a position adjacent the position of the pull head at which the broach is to be removed from the pull head.

8. In a broaching machine, a horizontally extending frame, a pull head mounted for reciprocation along the frame, supporting means on the frame for a work piece having a bore to be broached, a plurality of broaches each formed for engagement by the pull head and designed to operate successively upon the bore of the work piece, and a rack for said broaches mounted for travel along the frame and coupled to the pull head for reciprocation therewith, said rack being disposed and maintained adjacent the position occupied by a broach mounted in the pull head.

9. In the combination defined in claim 8, said rack having supports for holding the broaches, one above another in a substantially vertical plane, and extending in parallel relation to the working position of a broach engaged with the pull head.

10. In a broaching machine, an elongated frame, a pull head mounted for reciprocation along the frame, supporting means on the frame for a work piece having a bore to be broached, said pull head being mounted for rotation about an axis aligned with the axis of said bore, a broach locked in the pull head for rotation therewith and formed with splined cutting teeth, means on the frame interengaged with the pull head and operable to cause rotation thereof and of the broach at a predetermined rate as the pull head travels along the frame, said pull head including a cylindrical body portion with a cylindrical shell rotatable thereon, the body having an axial bore to receive the shank of the broach, said shank having a flattened area disposable in said bore, and a plunger slidably carried in the body with one end engaging said flattened area of the shank and with the other end confined by the shell, said shell having a clearance recess positioned to register with the plunger when the shell is rotatively adjusted on the body, permitting outward movement of the plunger to release the broach shank.

11. In a broaching machine, a horizontally extending frame, a crosshead mounted for reciprocation along the frame, a pull head carried by the crosshead, supporting means on the frame for a work piece having a bore to be broached, a broach secured in the pull head to be drawn through said bore, a slide extending from the crosshead, the frame having ways for said slide and crosshead, an hydraulic cylinder mounted under the work support and crosshead with a ram projectible from said cylinder below the slide, a terminal on the slide connected to the ram for its actuation thereby, a helically grooved bar fixed in the frame extending through the crosshead and parallel to said ways at one side of the axis of the pull head, said pull head being mounted for rotation about its axis and engaging the broach for rotating it, a follower nut on said bar journaled for rotation in the crosshead, and gearing in the crosshead connecting said nut with the pull head to rotate it as the crosshead advances along the ways.

12. In a broaching machine which includes a support for a work piece having a bore to be broached, a broach having a solid body and a series of splined cutting teeth, and means supplying coolant under pressure to said bore from the rear end of the broach, the rear faces of said cutting teeth against which the coolant is fed extending in planes perpendicular to the axis of the broach.

13. In a broaching machine, a horizontally extending frame, a pull head mounted for reciprocation along the frame, supporting means on the frame for a workpiece having a bore to be broached, a rack formed to support a plurality of broaches which are designed to be engaged by the pull head and to operate successively upon the bore of the workpiece, said rack being mounted for travel along the frame in a path substantially parallel to that of the pull head and being initially disposed adjacent the position at which a broach is inserted in the pull head, and means shifting said rack during the working stroke of the broach to a position adjacent the position of the pull head at which the broach is to be removed therefrom and shifting said rack during the return stroke to the position at which a different broach is to be inserted in the pull head.

14. A broach having a plurality of splined, helically disposed cutting teeth and including a pilot section positioned to enter the work ahead of said teeth and having non-cutting, elongated, helical splines of a pitch to follow in helical grooves previously formed in the workpiece.

15. A broach having a plurality of splined, helically disposed cutting teeth and including a pilot section positioned to enter the work ahead of said teeth and having non-cutting, elongated helical splines of a pitch to follow in helical grooves previously formed in the workpiece, said cutting teeth being of progressively increasing depth and of uniform width greater than the width of said non-cutting splines.

16. A broach having a plurality of splined cutting teeth and including a pilot section positioned to enter the work ahead of said teeth and composed of non-cutting, elongated splines positioned to follow in grooves previously formed in the work piece, said cutting teeth being of progressively increasing depth and of uniform width greater than the width of said non-cutting splines.

FRANCIS J. LAPOINTE.